United States Patent
Healey

(10) Patent No.: US 10,394,554 B1
(45) Date of Patent: Aug. 27, 2019

(54) SOURCE CODE EXTRACTION VIA MONITORING PROCESSING OF OBFUSCATED BYTE CODE

(71) Applicant: Stripe, Inc., San Francisco, CA (US)

(72) Inventor: Richard Healey, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 74 days.

(21) Appl. No.: 15/699,716

(22) Filed: Sep. 8, 2017

Related U.S. Application Data

(60) Provisional application No. 62/385,942, filed on Sep. 9, 2016.

(51) Int. Cl.
G06F 8/74 (2018.01)
G06F 8/53 (2018.01)
G06F 9/455 (2018.01)
G06F 21/14 (2013.01)

(52) U.S. Cl.
CPC ............... G06F 8/74 (2013.01); G06F 8/53 (2013.01); G06F 9/45504 (2013.01); G06F 21/14 (2013.01)

(58) Field of Classification Search
CPC ..... G06F 8/41; G06F 8/51; G06F 8/52; G06F 8/447; G06F 9/45508; G06F 9/45504; G06F 9/45516; G06F 8/45504; G06F 8/74; G06F 8/53; G06F 21/14
See application file for complete search history.

(56) References Cited

U.S. PATENT DOCUMENTS

| | | | | |
|---|---|---|---|---|
| 6,647,495 B1 * | 11/2003 | Takeuchi | .............. | G06F 21/126 705/57 |
| 7,877,613 B2 * | 1/2011 | Luo | .......................... | G06F 21/16 713/176 |
| 8,756,439 B1 * | 6/2014 | Jannson | ................... | G06F 21/62 380/279 |
| 9,021,271 B1 * | 4/2015 | Richards | ............... | G06F 21/123 713/189 |

(Continued)

*Primary Examiner* — Benjamin C Wu
(74) *Attorney, Agent, or Firm* — Womble Bond Dickinson (US) LLP

(57) ABSTRACT

In embodiments, methods and systems for implementing source code extraction are provided. Source code extraction facilitates processing obfuscated byte code and extracting source code representations of original source code of applications. Source code extraction is implemented based on leveraging and monitoring an interpreter (e.g., a software interpreter running on a virtual machine) when portions of obfuscated byte code (i.e., obfuscated compiled version of source code) are loaded or executed using the interpreter. In operation, the obfuscated byte code is accessed at the interpreter. The interpreter, processing the obfuscated byte code, is monitored using a source code extraction manager that supports instrumentation instances associated with functions of the obfuscated byte code. Instruction sequences of functions that the interpreter is processing are recorded using the source code extraction manager. Source code representations are generated based on the instruction sequences that are recorded while monitoring the functions that are processed by the interpreter.

19 Claims, 4 Drawing Sheets

(56) References Cited

U.S. PATENT DOCUMENTS

| | | | | |
|---|---|---|---|---|
| 9,032,526 | B2* | 5/2015 | Wang | G06F 9/455 726/24 |
| 2003/0236986 | A1* | 12/2003 | Cronce | G06F 21/14 713/189 |
| 2004/0003264 | A1* | 1/2004 | Zeman | G06F 21/14 713/190 |
| 2006/0075468 | A1* | 4/2006 | Boney | H04L 63/1408 726/2 |
| 2012/0246487 | A1* | 9/2012 | Gu | G06F 21/51 713/190 |
| 2012/0290848 | A1* | 11/2012 | Wang | G06F 21/566 713/188 |
| 2013/0232323 | A1* | 9/2013 | Lerouge | G06F 21/14 712/233 |
| 2014/0130158 | A1* | 5/2014 | Wang | G06F 21/566 726/23 |
| 2014/0165208 | A1* | 6/2014 | Chevallier-Mames | G06F 21/14 726/26 |
| 2015/0295907 | A1* | 10/2015 | Abrahamson | H04L 63/065 713/150 |
| 2016/0253189 | A1* | 9/2016 | Teuwen | G06F 8/74 726/22 |
| 2016/0357530 | A1* | 12/2016 | Cheng | G06F 8/47 |
| 2017/0024230 | A1* | 1/2017 | Li | G06F 8/41 |
| 2017/0300691 | A1* | 10/2017 | Upchurch | G06F 21/563 |
| 2018/0013791 | A1* | 1/2018 | Healey | H04L 63/20 |
| 2018/0359080 | A1* | 12/2018 | Brier | H04L 9/0618 |
| 2018/0373848 | A1* | 12/2018 | Lafortune | G06F 21/125 |

* cited by examiner

SOURCE CODE EXTRACTION VIA MONITORING PROCESSING OF OBFUSCATED BYTE CODE

CROSS-REFERENCED TO RELATED APPLICATIONS

This application claims the benefit pursuant to 35 U.S.C. 119(e) of U.S. Provisional Application No. 62/385,942, filed Sep. 9, 2016, which is specifically incorporated herein, in its entirety, by reference.

BACKGROUND

Computing applications operate based on software applications that are developed as source code. Source code can be compiled into byte code in order to support executing or running the application. Byte code can often be obfuscated to protect the confidentiality of the source code, amongst other reasons. For example, name obfuscation, string encryption, and code and data flow encryption, sometimes dynamically, can be applied to source code to protect the source code from being reverse engineered. Reverse engineering techniques, on the other hand, can be implemented to provide better understanding of source code even in situations where the source code has been obfuscated.

SUMMARY

Embodiments described herein provide methods and systems for implementing source code extraction for applications. Source code extraction includes processing obfuscated byte code and extracting source code representations of original source code of applications. Source code extraction, by way of example, can be implemented based on leveraging and monitoring an interpreter (e.g., a software interpreter running on a virtual machine) when portions of obfuscated byte code (i.e., obfuscated compiled version of source code) are loaded or executed using the interpreter. Source code extraction supports at least in part reversing the obfuscation and compilation of the original source code to generate source code representations of the original source code. For example, source code representations can include semantic structural representations, behavioral representations or decompiled representations of the original source code that are identified during source code extraction.

In operation, a source code extraction system supports using a source code extraction manager for processing obfuscated byte code to generate source code representations of the original source code. By way of example, in certain embodiments, the source code extraction manager can be implemented on a virtual machine running an interpreter of the obfuscated byte code. The obfuscated byte code is loaded into the virtual machine and analyzed based on instrumentation of the obfuscated byte code. The source code extraction system supports instrumentation (e.g., hooks into the byte code) of the obfuscated byte code. Instrumentation can refer to the ability to monitor or evaluate code. Code instrumentation is based on code instructions that monitor specific components of code. Source code extraction includes using instrumentation instances to monitor the virtual machine running the obfuscated byte code. In particular, an instrumentation instance can be associated with a function of the byte code, where the instrumentation instance at least in part records instruction sequences of the function. A source code representation (e.g., semantic structural representations, behavioral representations or decompiled representation) can be generated from the recorded instruction sequences. In particular, the decompiled representation is generated based on a decompiler that decompiles a source code representation of the instruction sequences from the virtual machine interpreter to the decompiled representation.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

A system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Figure 4:
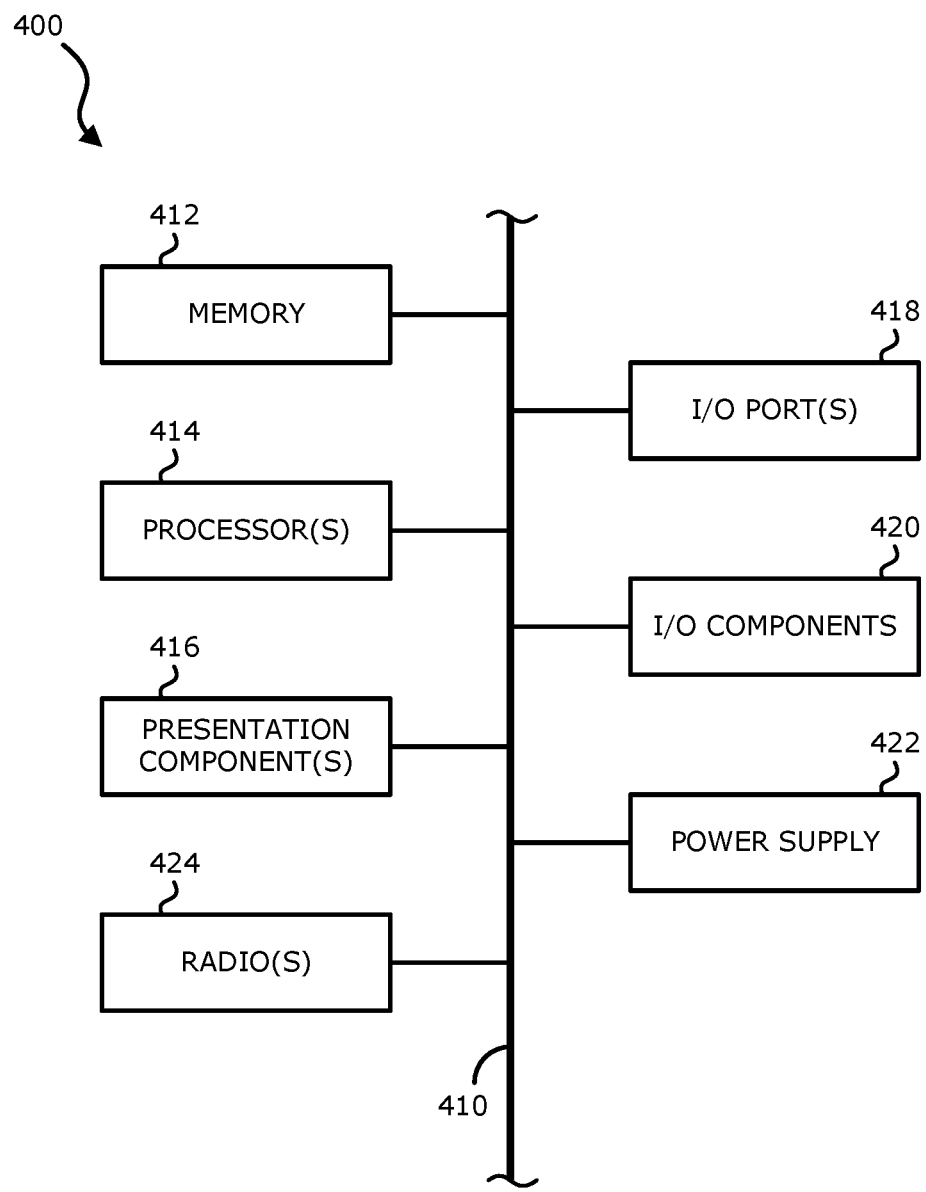
FIG. 4 is a block diagram of an exemplary computing environment suitable for use in implementing embodiments described herein.

Having identified various components of the distributed computing applications, it is noted that any number of components may be employed to achieve the desired functionality within the scope of the present disclosure. The various components of FIGS. 1-2 and 4 are shown with lines for the sake of clarity. Further, although some components of FIGS. 1-2 and 4 are depicted as single components, the depictions are exemplary in nature and in number and are not to be construed as limiting for all implementations of the present disclosure. The source code extraction system functionality can be further described based on the functionality and features of the above-listed components.

Other arrangements and elements (e.g., machines, interfaces, functions, orders, and groupings of functions, etc.)

can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Embodiments described herein provide simple and efficient methods and systems for implementing source code extraction system. Source code extraction facilitates, for source code of an application, processing obfuscated byte code of original source code and extracting source code representations of the original source code. The source code extraction system, by way of example, can be implemented based on monitoring an interpreter, using instrumentation or hooks into obfuscated byte code (i.e., obfuscated compiled version of source code) running on the interpreter (e.g., a software interpreter running on a virtual machine). Portions of obfuscated byte code may also be loaded to be executed using the interpreter. Source code extraction supports, at least in part, reversing the obfuscation and compilation of the original source code to generate source code representations of the original source code. For example, source code representations can include semantic structural representations, behavioral representations or decompiled representations of the original source code that are identified during source code extraction.

Figure 1A:
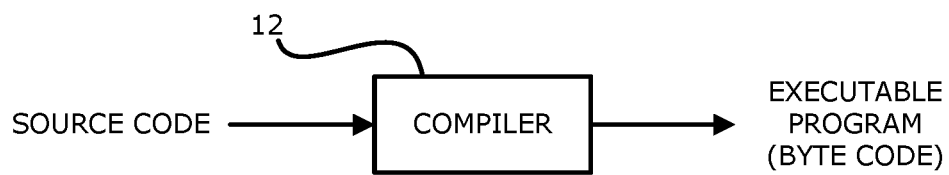
FIGS. 1A-1B are block diagram representations of a compiler and a decompiler, respectively.
Figure 1B:
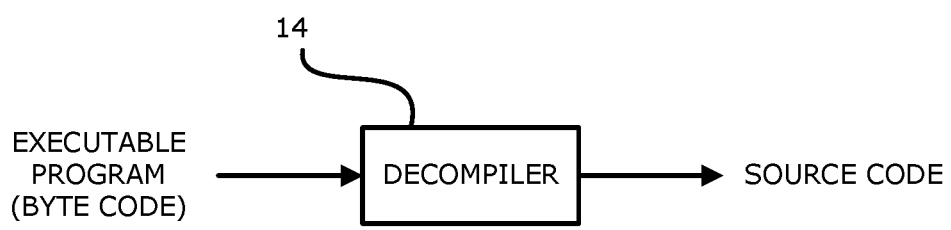
Figure 2:
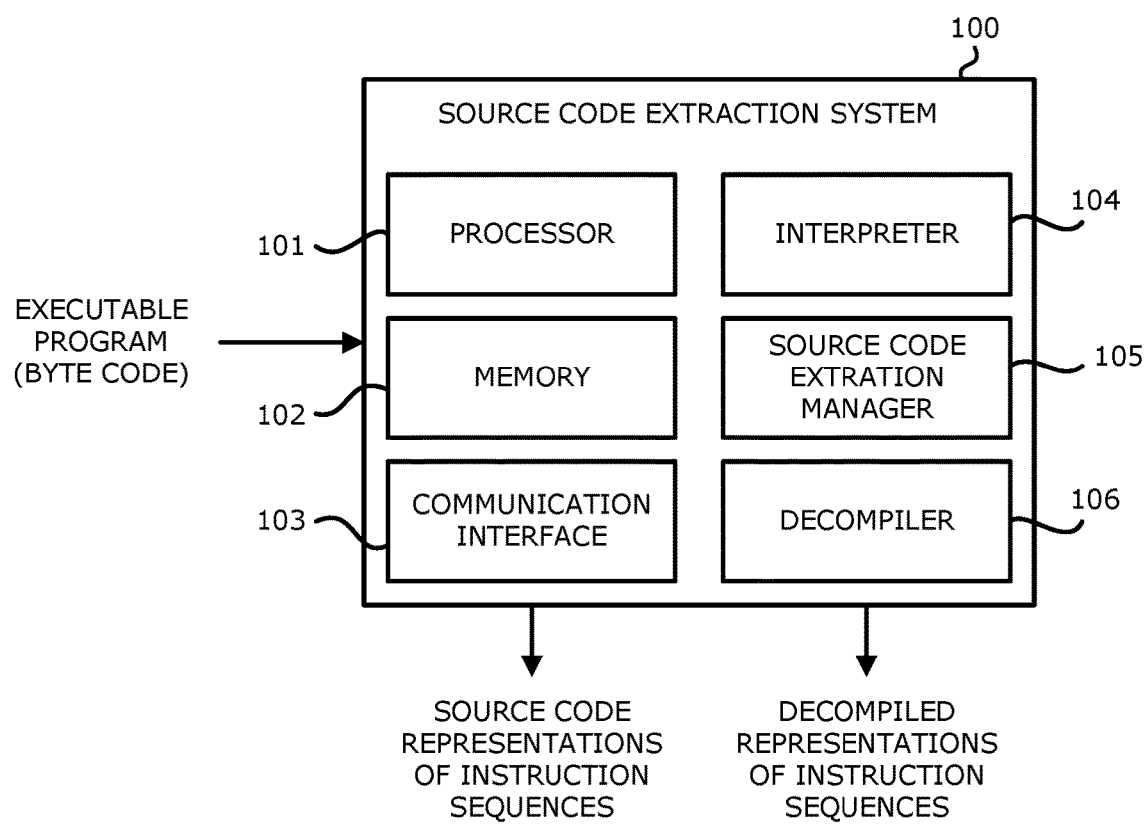
FIG. 2 is a block diagram of an exemplary source code extraction system in accordance with one embodiment of the invention.

FIGS. 1A-1B are block diagram representations of a compiler 12 and a decompiler 14, respectively. By way of background, a software developer or computer programmer can write code that is used as part of an application. An application can generally refer to a computer program designed to perform functions, tasks or activities to support different types of operations. The code of an application can be referred to as source code, where source code includes a collection of computer instructions that specific actions performed via the application. As shown in FIG. 1A, a compiler 12 may be used to transform source code from a source language to a target language to create an executable program. The compiler 12 may produce byte code (or p-code) that is sequence instructions in the target language for executing the application. A software interpreter (not shown) can execute the byte code. Byte code may often be either directly executed on a virtual machine (e.g., interpreter) or it may be further compiled into machine code for better performance.

As shown in FIG. 1B, the byte code can be reversed (or decompiled) into source code by a decompiler 14. However, this may be problematic for several reasons including the confidentiality of the source code. Accordingly, byte code obfuscation techniques exist to limit the capacity of simply reversing byte code to source code. Byte code obfuscation, that generates obfuscated byte code, includes several techniques (e.g., name obfuscation, string encryption, and code and data flow encryption). In one exemplary implementation, byte code obfuscation techniques are dynamically implemented that make the byte code mechanical difficult to be retrieved. Some of these techniques make reversing byte code extremely difficult, even in situations where for security purposes malware need to be reversed to source code to protect against future attacks or identify the source of the malware.

FIG. 2 is a block diagram of an exemplary source code extraction system 100 in accordance with one embodiment of the invention. As shown in FIG. 2, the source code extraction system 100 receives the executable program and performs source code extraction to provide the source code.

In FIG. 2, the source code extraction system 100 includes a processor 101, memory 102, communication interface 103, interpreter 104, source code extraction manager 105, and decompiler 106.

The communication interface 103 may be an interface that is coupled to a network (not shown) in order to receive information and transmit information. The storage 102 may include one or more different types of storage such as hard disk drive storage, nonvolatile memory, and volatile memory such as dynamic random access memory.

The processor 101 may be coupled to the communication interface 103 and the storage 102. The processor 101 may be a microprocessor, a microcontroller, a digital signal processor, or a central processing unit. The term "processor" may refer to a device having two or more processing units or elements, e.g. a CPU with multiple processing cores. The processor 101 may be used to control the operations of the source code extraction system 100 by executing software instructions or code stored in the storage 102. For example, the processor 101 may execute instructions stored in the storage 102, which cause the processor 101 to control the operations of the source code extraction system 100 and perform source code extraction as delineated in some embodiments of the invention.

At a high level, the source code extraction system 100 leverages the functionality of the interpreter 104 to identify instruction sequences that can be used to generate source code representations.

For purposes of a detailed discussion herein, embodiments are described with reference to the interpreter 104 running as a virtual machine in combination with a source code extraction system. Components can be configured to perform novel aspects of embodiments described herein, where "configured to" includes components that are programmed to perform particular tasks or implement particular abstract data types using computer code. It is contemplated that the methods described herein can be performed in different types of operating environments having alternate configurations of the functional components described herein. As such, the embodiments described herein are merely exemplary, and it is contemplated that the techniques may be extended to other implementation contexts.

In one exemplary embodiment, the interpreter 104 evaluates instruction sequences of the source code. The interpreter 104 may access obfuscated byte included in an application code when running the application (or executable program). The application can be in an executing state, where the interpreter 104 is facilitating running the application or the application may merely be in a loading state, where the interpreter 104 is facilitating loading the obfuscated byte code (e.g., as files) that are used to execute the application. It is contemplated that the executing state, loading state or manual loading state (i.e., where particular files are manually and not automatically loaded onto the interpreter 104) can trigger instrumentation (i.e., hooks for monitoring functions of the obfuscated byte code) of the application.

In FIG. 2, the source code extraction manager 105 may be defined for instrumentation to monitor the instruction sequences that are processed by the interpreter 104 and to generate a source code representation bases on the monitored (or recorded) instruction sequences. In another embodiment, the source code extraction manager 105 may perform the source code instrumentation for specific source code portions (e.g., classes, methods, functions, modules or behaviors) that are of interest, instead of whole instruction sequences. For example, the source code extraction manager 105 can hook into class and object creation or module creation and identify (or record) instruction sequences associated with their properties. In one embodiment, the source code extraction manager 105 uses the identified instruction sequences to generate the different types of source code representations.

Source code representations generated by the source code extraction manager 105 can refer to semantic structural representations, behavioral representations that are generated from the recorded instruction sequences.

In one embodiment, the source code representations may comprise a partial recreation of the source code tree with some elements of the original source code dropped. In one embodiment, the source code representations include the semantic structure of the original source code (e.g., class and method structures) that indicates the structure and behavior of the source code. In particular, because the instruction sequences represent the body of a function or method, the behaviors of the original source code may be represented in the source code representations.

Referring back to FIG. 2, the decompiler 106 accesses the instruction sequences that were monitored or recorded by the source code extraction manager 105 and translates the monitored or recorded instruction sequences into a decompiled representation. Accordingly, the decompiled representation can be generated from the recorded instruction sequences. In one exemplary source code representation, the source code representation is a decompiled representation, where the recorded instruction sequences are processed through the decompiler 106 to generate the decompiled representation of the original source code. For example, the decompiler 106 can use pattern matching to generate the decompiled representation. Other variations and combinations of source code representations are contemplated with embodiments of described herein.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 3:
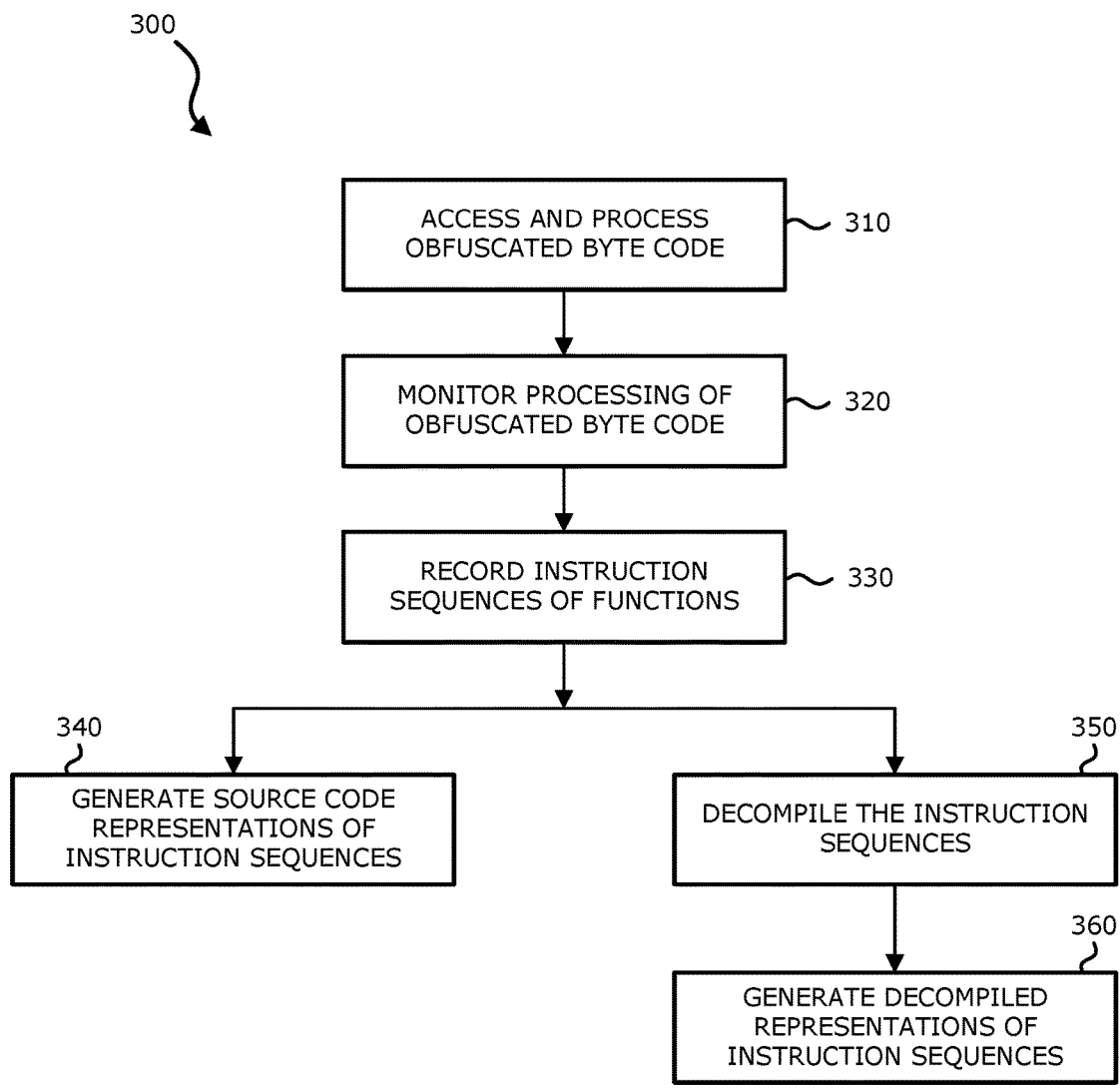
FIG. 3 is a flow diagram showing an exemplary method for providing source code extraction, in accordance with one embodiment of the invention.

FIG. 3 is a flow diagram showing an exemplary method 300 for providing source code extraction, in accordance with one embodiment of the invention. The method 300 starts at Block 310 with the interpreter 104 included in the source code extraction system 100 accessing and processing obfuscated byte code. The obfuscated byte code may be included in an executable program that is being executed by the interpreter 104. In one embodiment, the interpreter 104 processes the obfuscated byte code by loading the obfuscated byte code or by executing the obfuscated byte code. In one embodiment, the obfuscated byte code is an instruction set for execution using the interpreter 104 based on parsing and directly executing the instruction set one at a time. In one embodiment, the interpreter 104 is a software interpreter running in reverse engineering mode on a virtual machine. In this embodiment, the software interpreter processes source code that is compiled into byte code and then obfuscated into the obfuscated byte code.

At Block 320, the source code extraction manager 105 included in the source code extraction system 100 monitors the processing of the obfuscated byte code by the interpreter 104. The source code extraction manager 105 may support instrumentation instances associated with functions of the obfuscated byte code. In one embodiment, one of the instrumentation instances is programmed to monitor a corresponding function based on the interpreter 104 directly accessing the function in the obfuscated byte code. In one embodiment, the source code extraction manager 105 monitoring the processing of the obfuscated byte code by the interpreter 104 includes detecting the interpreter 104 accessing a function to identify the instruction sequences for the function that is accessed.

At Block 330, the source code extraction manager 105 records the instruction sequences of functions based on the monitored processing of obfuscated byte code by the interpreter 104. In one embodiment, the source code extraction manager 105 recording the instruction sequences of functions includes identifying a semantic structure and behavior associated with the corresponding functions.

At Block 304, the source code extraction manager 105 generates source code representations of instruction sequences based on the recorded instruction sequences of functions. In one embodiment, the source code representations are generated based on the instruction sequences that are recorded while monitoring functions that are processed by the interpreter 104. In one embodiment, one of the monitored functions is a callable unit (i.e., a unit that may be called in the executable code) in the obfuscated byte code that is associated with an instrumentation instance such that, when accessed by the interpreter 104, the instrumental instance traces instruction sequences associated with the one of the monitored functions.

At Block 350, the decompiler 106 decompiles instruction sequences of functions that were recorded by the source code extraction manager 105 in Block 330. The decompiler 106 translates the recorded instruction sequences into a decompiled representation. At Block 360, the decompiler 106 generates decompiled representations of instruction sequences.

In one embodiment, the decompiler 106 receives the source code representations of instruction sequences generated by the source code extraction manager 105 and translates the source code representations of instruction sequences into a decompiled representation.

With reference to the source code extraction system 100 in FIG. 2, embodiments described herein can improve source code extraction using the source code extraction system 100. The source code extraction system 100 components refer to integrated components that implement source code extraction services. The integrated components refer to the hardware architecture and software framework that support functionality using the source code extraction system. The hardware architecture refers to physical components and interrelationships thereof and the software framework refers to software providing functionality that can be implemented with hardware operated on a device. The end-to-end software-based source code extraction system can operate within the platform components to operate computer hardware to provide platform functionality. As such, the source code extraction system 100 components can manage resources and provide services for the source code extraction system functionality. Any other variations and combinations thereof are contemplated with embodiments described herein.

By way of example, the source code extraction system 100 can include an API library that includes specifications for routines, data structures, object classes, and variables may support the interaction the hardware architecture of the device and the software framework of the source code extraction system. These APIs include configuration specifications for the source code extraction system such that the components therein can communicate with each other in the source code extraction system, as described herein.

Having described embodiments of the present disclosure, an exemplary operating environment in which embodiments of the present disclosure may be implemented is described below in order to provide a general context for various aspects of the present disclosure. Referring initially to FIG. 4 in particular, an exemplary operating environment for implementing embodiments of the present disclosure is shown and designated generally as computing device 400. Computing device 400 is but one example of a suitable computing environment and is not intended to suggest any limitation as to the scope of use or functionality of the disclosure. Neither should the computing device 400 be interpreted as having any dependency or requirement relating to any one or combination of components illustrated.

The embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The embodiments may be practiced in a variety of system configurations, including hand-held devices, consumer electronics, general-purpose computers, more specialty computing devices, etc. The embodiments may also be practiced in distributed computing applications where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output ports 418, input/output components 420, and an illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 4 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" involves "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing source code extraction, the system comprising:
   a memory; and
   a processor coupled with the memory to:
   access obfuscated byte code by an interpreter,
   process the obfuscated byte code, wherein the obfuscated byte code is an instruction set compiled from original source code, and wherein the instruction set is executable by the interpreter based on parsing and directly executing instruction from the instruction set one at a time,
   monitor processing of the obfuscated byte code by the interpreter using instrumentation instances associated with functions of the obfuscated byte code,
   record instruction sequences of functions based on the monitored processing of the obfuscated byte code by the interpreter, and
   generate source code representations of the original source code based on the recorded instruction sequences of functions.

2. The system of claim 1, wherein processing the obfuscated byte code further comprises loading the obfuscated byte code or executing the obfuscated byte code.

3. The system of claim 1, wherein one of the instrumentation instances is programmed to monitor a corresponding function based on the interpreter directly accessing the function in the obfuscated byte code.

4. The system of claim 1, wherein one of the monitored functions is a callable unit in the obfuscated byte code that is associated with one of the instrumentation instances, wherein when the one of the monitored functions is accessed using interpreter, the one of the instrumentation instances traces instruction sequences associated with the one of the monitored functions.

5. The system of claim 1, wherein monitor processing of the obfuscated byte code by the interpreter further comprises detecting the interpreter accessing a function to identify the instruction sequences for the function that is accessed.

6. The system of claim 5, wherein recording the instructions sequences for functions includes identifying a semantic structure and behavior associated with the corresponding function from the original source code.

7. The system of claim 1, further comprising the processor configured to:
   decompile the recorded instruction sequences of functions; and
   generate decompiled representations of instruction sequences.

8. A computer-implemented method for implementing source code extraction, the method comprising:
   accessing obfuscated byte code processed by an interpreter, wherein the obfuscated byte code is an instruction set compiled from original source code, and wherein the instruction set is executable using the interpreter based on parsing and directly executing instructions from the instruction set one at a time;
   monitoring processing of the obfuscated byte code by the interpreter using instrumentation instances associated with functions of the obfuscated byte code;
   recording instruction sequences of functions based on the monitored processing of the obfuscated byte code by the interpreter; and
   generating source code representations of the original source code based on the recorded instruction sequences of functions.

9. The method of claim 8, wherein the interpreter is a software interpreter running in reverse engineering mode on a virtual machine, where the software interpreter processes source code that is compiled into byte code and then obfuscated into the obfuscated byte code.

10. The method of claim 8, wherein one of the instrumentation instances is programmed to monitor a corresponding function based on the interpreter directly accessing the function in the obfuscated byte code.

11. The method of claim 8, wherein one of the monitored functions is a callable unit in the obfuscated byte code that is associated with one of the instrumentation instances, wherein when the one of the monitored functions is accessed using interpreter, the one of the instrumentation instances traces instruction sequences associated with the one of the monitored functions.

12. The method of claim 8, wherein monitor processing of the obfuscated byte code by the interpreter further comprises detecting the interpreter accessing a function to identify the instruction sequences for the function that is accessed.

13. The method of claim 8, wherein recording instructions sequences for a function further includes identifying a semantic structure and behavior associated with the corresponding function from the original source code.

14. The method of claim 8, further comprising receiving the source code representation by a decompiler, and translating by the decompiler the instruction sequences of the source code representation into a decompiled representation.

15. One or more computer storage media having computer-executable instructions embodied thereon that, when executed by one or more processors, causes the one or more processors to perform a method for implementing source code extraction, the method comprising:
   accessing obfuscated byte code by an interpreter, wherein the obfuscated byte code is an instruction set compiled from original source code, and wherein the instruction set is executable using the interpreter based on parsing and directly executing instructions from the instruction set one at a time;
   monitoring processing of the obfuscated byte code by the interpreter, the source code extraction manager supports instrumentation instances associated with functions of the obfuscated byte code;
   recording instruction sequences of functions based on the monitored processing of the obfuscated byte code by the interpreter; and
   decompiling the recorded instruction sequences of functions to generate decompiled representations of instruction sequences of the original source code.

16. The method of claim 15, wherein one of the monitored functions is a callable unit in the obfuscated byte code that is associated with one of the instrumentation instances, wherein when the one of the monitored functions is accessed using interpreter, the one of the instrumentation instances traces instruction sequences associated with the one of the monitored functions.

17. The method of claim 15, wherein monitor processing of the obfuscated byte code by the interpreter further comprises detecting the interpreter accessing a function to identify the instruction sequences for the function that is accessed.

18. The method of claim 15, wherein recording instructions sequences for a function further includes identifying a semantic structure and behavior associated with the corresponding function from the original source code.

19. The method of claim 15, wherein the interpreter is a software interpreter running in reverse engineering mode on a virtual machine, where the software interpreter processes source code that is compiled into byte code and then obfuscated into the obfuscated byte code.

\* \* \* \* \*